United States Patent
Egevang

(10) Patent No.: US 7,298,745 B2
(45) Date of Patent: Nov. 20, 2007

(54) METHOD AND APPARATUS TO MANAGE PACKET FRAGMENTATION WITH ADDRESS TRANSLATION

(75) Inventor: Kjeld B. Egevang, Smorum (DK)

(73) Assignee: Intel Corporation, Santa Clara, CA (US)

( * ) Notice: Subject to any disclaimer, the term of this patent is extended or adjusted under 35 U.S.C. 154(b) by 466 days.

(21) Appl. No.: 10/015,959

(22) Filed: Nov. 1, 2001

(65) Prior Publication Data

US 2003/0081605 A1    May 1, 2003

(51) Int. Cl.
*H04L 12/28* (2006.01)
*H04L 12/56* (2006.01)

(52) U.S. Cl. .................. 370/394; 370/392; 370/476; 709/236

(58) Field of Classification Search ................ 370/387, 370/392, 422, 429, 465, 469, 473, 351, 474, 370/476, 401, 475, 394, 216, 217, 218, 219, 370/220, 221, 503; 709/230, 232, 231, 238, 709/239, 242, 244, 245, 246, 236, 249, 235, 709/206, 213, 224; 714/18, 4
See application file for complete search history.

(56) References Cited

U.S. PATENT DOCUMENTS

| | | | |
|---|---|---|---|
| 5,815,516 A * | 9/1998 | Aaker et al. ................ 714/807 |
| 6,157,955 A * | 12/2000 | Narad et al. ................ 709/228 |
| 6,453,357 B1 * | 9/2002 | Crow et al. ................ 709/236 |
| 6,650,641 B1 * | 11/2003 | Albert et al. ................ 370/392 |
| 6,714,985 B1 * | 3/2004 | Malagrino et al. .......... 709/236 |
| 6,742,045 B1 * | 5/2004 | Albert et al. ................ 709/238 |
| 6,888,838 B1 * | 5/2005 | Ji et al. ...................... 370/401 |
| 7,089,320 B1 * | 8/2006 | Biederman et al. ......... 709/234 |
| 2002/0095512 A1 * | 7/2002 | Rana et al. ................. 709/232 |
| 2002/0136217 A1 * | 9/2002 | Christensen ................. 370/393 |
| 2002/0161915 A1 * | 10/2002 | Crow et al. ................. 709/236 |

FOREIGN PATENT DOCUMENTS

| WO | WO 99/66680 | 12/1999 |
|---|---|---|
| WO | WO 00/02114 | 1/2000 |

OTHER PUBLICATIONS

W. Richard Stevens, TCP/IP Illustrated vol. 1 the protocols, 1994, addison-wesley, pp. 148-151.*
Srisuresh et al., "Traditional IP Network Address Translator (Traditional NAT)", RFC 3022, Jan. 2001, 16 pages.
"Internet Protocol DARPA Internet Program Protocol Specification", RFC: 791, Sep. 1981, pp. 1-45, Information Sciences Institute, University of Southern California, USA.

* cited by examiner

*Primary Examiner*—Edan Orgad
*Assistant Examiner*—Chuong Ho
(74) *Attorney, Agent, or Firm*—Kacvinsky LLC

(57) ABSTRACT

Embodiments of a method and apparatus to improve network performance by managing packet fragmentation with address translation are described.

21 Claims, 7 Drawing Sheets

METHOD AND APPARATUS TO MANAGE PACKET FRAGMENTATION WITH ADDRESS TRANSLATION

BACKGROUND

Packet fragmentation relates to a communications technology that may reduce the latency for transmitting information across a network, such as when it might be desirable to provide a higher level of service. Conventional packet fragmentation technology, however, may not employ packet fragmentation as effectively as desired. This may be particularly true when packet fragmentation is used in combination with address translation. Consequently, there may be a need to improve the implementation of packet fragmentation in a network.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Figure 1:
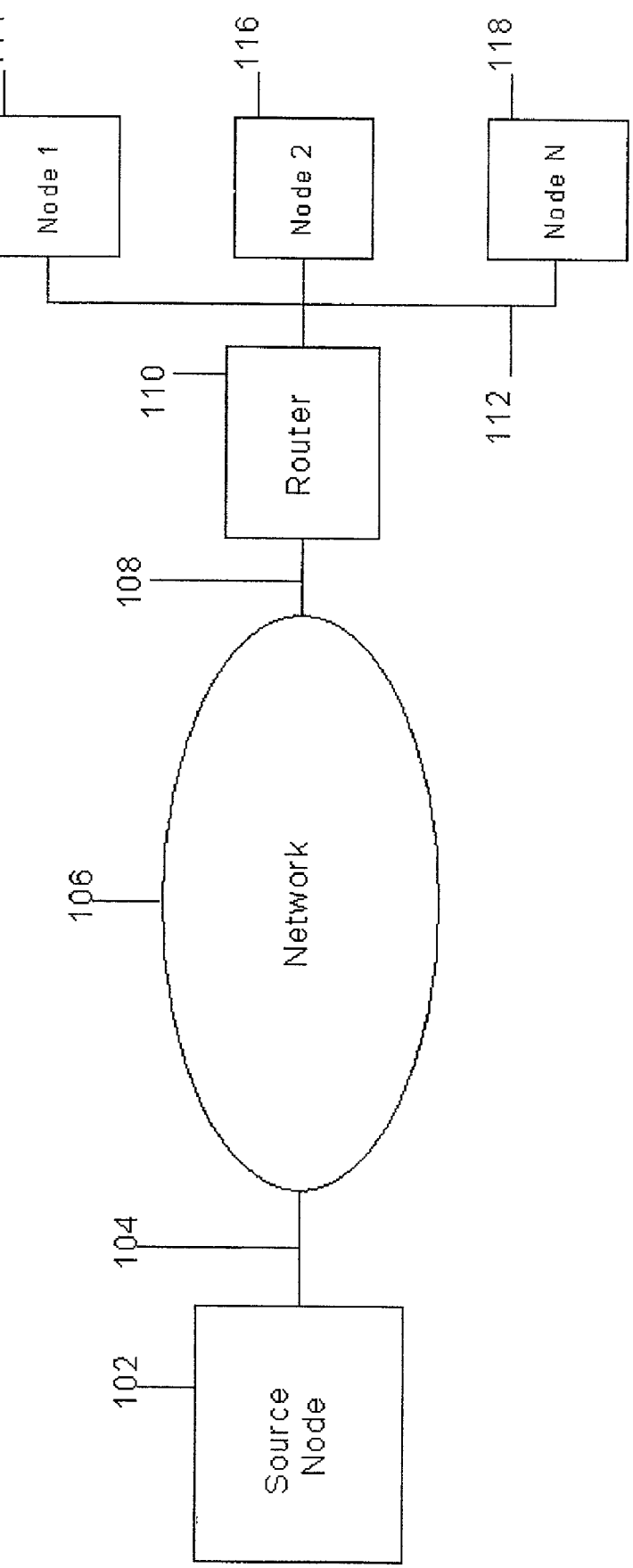
FIG. 1 is a block diagram of a system suitable for practicing one embodiment of the invention.

In the following detailed description, numerous specific details are set forth in order to provide a thorough understanding of the embodiments of the invention. It will be understood by those skilled in the art, however, that embodiments of the invention may be practiced without these specific details. In other instances, well-known methods, procedures, components and circuits have not been described in detail so as not to obscure the foregoing embodiments of the invention.

Embodiments of the invention may improve performance of a communications network, such as a packet switching network. One embodiment of the invention improves performance of a packet switching network by improving management of packet fragmentation. Packet fragmentation in this context may refer to breaking a packet of information into a series of packet fragments that are typically smaller than the original packet.

More particularly, one embodiment of the invention manages packet fragmentation in combination with address translation. Address translation in this context may refer to translating a large number of addresses into fewer or a single address, and vice-versa. Consequently, this may improve the overall capacity and performance of a network. Accordingly, users may benefit from faster response times from network applications and services.

Packet switching continues to be an effective technology for voice and data communications. Packet switching in this context may refer to communicating information over a network in the form of relatively short packets. A packet in this context refers to a set of information of a limited length, with the length typically represented in terms of bits or bytes. An example of a packet length might be 1000bytes. A network typically comprises a number of nodes interconnected by a communications medium. The nodes may be capable of communicating information to other nodes over the communications medium using one or more protocols. A node in this context may include any device capable of communicating information, such as a computer, server, switch, router, bridge, gateway and so forth. A communications medium may be any medium capable of carrying information signals, such as twisted-pair wire, co-axial cable, fiber optics, radio frequencies and so forth. A protocol may comprise a set of instructions by which the information signals are communicated over the communications medium. For example, the protocol might be a packet switching protocol such as the Transmission Control Protocol (TCP) as defined by the Internet Engineering Task Force (IETF) standard 7, Request For Comment (RFC) 793, adopted in September, 1981 ("TCP Specification"), and the Internet Protocol (IP) as defined by the IETF standard 5, RFC 791 ("IP Specification"), adopted in September, 1981, both available from "www.ietf.org" (collectively referred to as the "TCP/IP Specification").

A packet switching network may comprise a source node, a destination node, and a number of intermediate nodes. The source node may comprise a node that originates a set of information for delivery to the destination node. Information may comprise any data capable of being represented as a signal, such as an electrical signal, optical signal, acoustical signal and so forth. Examples of information in this context may include data from a voice conversation, videoconference, streaming video, electronic mail ("email") message, voice mail message, graphics, image, video, text and so forth. The destination node may comprise a node that receives information. The intermediate nodes may comprise nodes that communicate the information from the source node to the destination node.

In operation, the source node may send information to the destination node through one or more intermediate nodes in the form of packets. The source node breaks a set of information into a series of packets. Each packet may contain a portion of the information plus some control information. The control information may assist intermediate nodes in the network to route each packet to the destination node. The source node sends the packets over the network, where an intermediate node receives the packets, stores them briefly, and passes them to the next intermediate node. This continues to occur until the destination node eventually receives the entire series of packets and uses them to reproduce the information from the source node.

Transporting packets through intermediate nodes, however, becomes more complicated if a packet has a higher priority associated with it. Information may be assigned different levels of priority. Information with a higher priority may be given preferential treatment as it passes through the network. An example of higher priority information may include time sensitive information, such as information from a voice message. If packets carrying voice information are delayed in the network, the receiving party may perceive silent periods that exceed the natural pauses and rhythm of a normal telephone conversation, for example. Information that may be less sensitive to time delays in a network, such as an email message or voice message, on the other hand, typically has a lower priority. If packets carrying an email message are delayed, the delay frequently goes unnoticed by the intended recipient, unless excessive. Consequently, intermediate nodes are often capable of determining the priority level of a packet and processing it accordingly. Transporting packets of lower priority may be relatively straightforward since these packets do not require any preferential treatment. Transporting packets of higher priority, however, may employ additional technology to reduce delays in the network. Packet fragmentation is one technique for reducing network delays for higher priority packets.

In one embodiment of the invention, packet fragmentation may refer to breaking a packet of information into a series of packet fragments. Each packet fragment typically has a length smaller than the original packet. A length in this context refers to the number of bits or bytes of information comprising the packet or packet fragment. For example, an original packet might have a length of 1500 bytes while a packet fragment might have a length of 100 bytes. Each packet fragment may contain a portion of the information from the original packet plus a fragment header. A fragment header in this context comprises one or more bits representing control information that may assist another node in reassembling the packet fragments into the original packet.

Packet fragmentation is one technique for reducing network delays for higher priority packets. More particularly, the use of packet fragments permits an intermediate node to communicate packet fragments with a higher priority between packet fragments of lower priority. For example, an intermediate node may receive a first and second packet, with the first packet having a lower priority then the second packet. The first packet may comprise information from an email message, for example. The second packet may comprise information from a voice conversation, for example. The intermediate node may store the first and second packets in a transmit queue. A transmit queue in this context may refer to memory to store packets until ready for transmission by the network device. The transmit queue may be organized as a first-in first-out (FIFO) structure. A FIFO in this context refers to a memory structure that orders packets from most recently stored to least recently stored, and where each packet is retrieved from memory in the order from least recently stored packet to most recently stored packet. For example, a line in a grocery store typically operates as a FIFO, where the first person in line is the next person to be serviced at the register. Consequently, if the first packet is received at the intermediate node prior to the second packet, the intermediate node may store the second packet behind the first packet in the transmit queue. This means that the second packet will not be sent until the first packet is fully transmitted. Transmission of the first packet, however, may introduce a level of delay that may not be tolerated by the second packet. In other words, the transmission of the first packet may take so long that the second packet will not arrive at its destination node within an acceptable time frame. Using packet fragmentation, the intermediate node may be able to insert packet fragments from the second packet between packet fragments from the first packet in the transmit queue, thereby reducing the latency created by the first packet to acceptable levels.

The transmit queue problem described above may be better illustrated by way of example. Assume that the length of the first packet is 1500 bytes. Further, assume that the network device may transmit the first packet over a connection operating at a connection speed of approximately 64 kilobits per second (kbps). Transmission of the first packet would take approximately 200 milliseconds (ms), or approximately 0.13 ms per byte. Assume the second packet comprises information from a voice conversation that can tolerate up to 4 ms of delay. If the second packet is behind the first packet in the transmit queue, the second packet will be delayed for 200 ms while the entire first packet is being transmitted, which is far more than the 4 ms delay tolerance of the second packet. As a result, the second packet will arrive late at the destination node. If the intermediate node employs patent fragmentation, however, the first packet may be broken down into packet fragments with a length smaller than 1500 bytes. For example, the first packet may be broken down into packet fragments of 30 bytes each. Transmission time of a 30 byte packet fragment from the first packet would take approximately 3.99 ms. Consequently, the intermediate node may interrupt transmission of the first packet after a packet fragment for the first packet has been fully transmitted, thereby reducing transmission delay for the second packet to below 4 ms.

Packet fragmentation may be particularly problematic when used in combination with address translation. One type of address translation may be referred to as network address translation (NAT). NAT enables a local area network (LAN) to use one set of IP addresses for internal traffic and a second set of addresses for external traffic. A NAT device may be located where a LAN meets the Internet to make all desired IP address translations. NAT may provide a type of firewall by hiding internal IP addresses. NAT may also enable a company to use more internal IP addresses. Since they're used internally only, there is a reduced possibility of conflict with IP addresses used by other companies and organizations. NAT may also allow a company to combine multiple network connections into a single Internet connection.

Conventional implementations of packet fragmentation as used with address translation, however, may be unsatisfactory. Address translation may need information from the header of a packet, such as the port number that may be used to identify a connection over which the packet is to be communicated. When the packet is fragmented, however, only the first fragment typically holds a valid header containing the appropriate port number(s). Since it is acceptable to send fragments disordered or even backwards, it may be difficult to retrieve the appropriate port number(s) for address translation. One potential solution to this problem is to reassemble the packet fragments, retrieve the port number from the packet header, and then disassemble the packet into packet fragments again for communication over the designated port number. This assembly/disassembly fragmentation process, however, may be processor and memory intensive operations that may impact the packet forwarding performance of a network device, such as a router. Embodiments of the invention, as described in more detail hereinafter, may reduce this and other problems by managing packet fragmentation in a manner that reduces the need to perform the fragmentation process prior to forwarding a packet through a network device.

It is worthy to note that any reference in the specification to "one embodiment" or "an embodiment" means in this context that a particular feature, structure, or characteristic described in connection with the embodiment may be included in at least one embodiment of the invention. The appearances of the phrase "in one embodiment" in various places in the specification do not necessarily all refer to the same embodiment.

Referring now in detail to the drawings wherein like parts are designated by like reference numerals throughout, there is illustrated in FIG. 1 a system suitable for practicing one embodiment of the invention. FIG. 1 is a block diagram of a system 100 comprising a source node 102 connected to a network 106 via connection 104. A network device such as a router 110 is connected to network 106 via connection 108. Router 110 is connected to a LAN 112. LAN 112 includes nodes 1, 2 and N, designated as nodes 114, 116 and 118, respectively. Router 110 represents any network device configured to perform address translation, such as NAT. Although FIG. 1 shows a limited number of network nodes, it can be appreciated that any number of network nodes may be used in system 100 and still fall within the scope of the invention. Furthermore, the terms "connection" and "interconnection," and variations thereof, in this context may refer to physical connections and/or logical connections.

Figure 2:
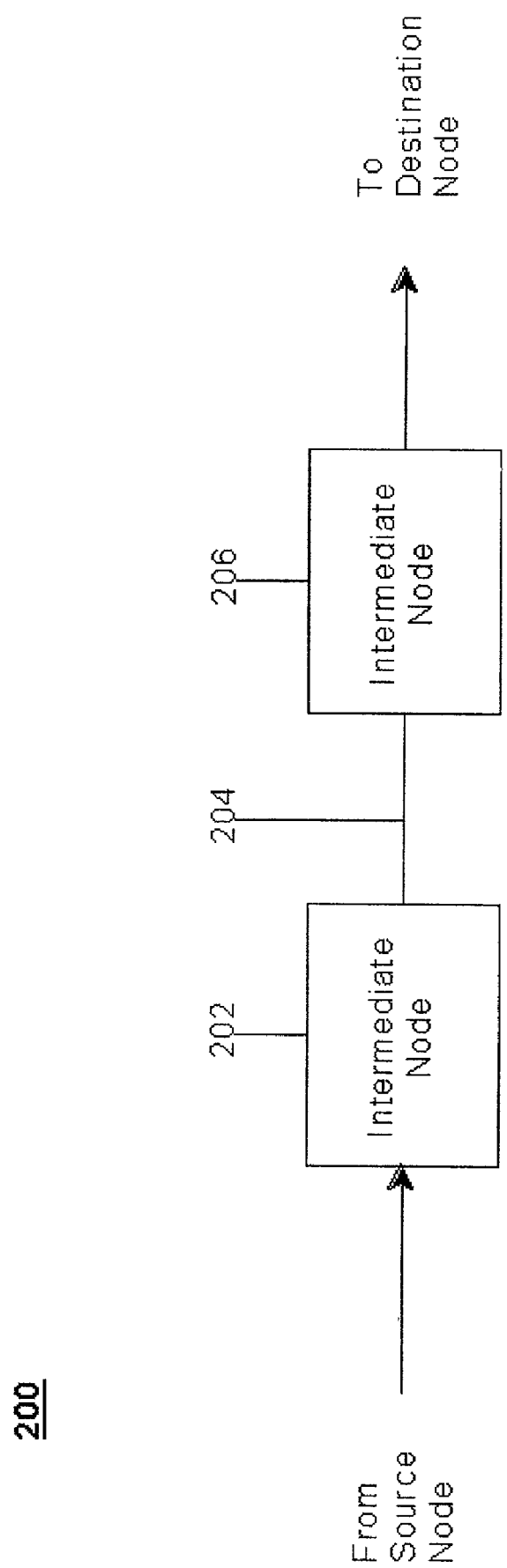
FIG. 2 is a block diagram of a network in accordance with one embodiment of the invention.

FIG. 2 is a block diagram of a network in accordance with one embodiment of the invention. FIG. 2 illustrates a network 200 that may be representative of network 106. Network 200 comprises an intermediate node 202 connected to an intermediate node 206 over a connection 204. Intermediate node 202 may, for example, receive signals from a source node, such as source node 102. Intermediate node 206 may send signals to a destination node, such as network nodes 114, 116 or 118. Although there are only two intermediate nodes shown in FIG. 2, it can be appreciated that any number of intermediate nodes may be used in network 200 and still fall within the scope of the invention.

In one embodiment of the invention, the intermediate nodes may perform packet fragmentation. Intermediate nodes may perform packet fragmentation in accordance with any conventional packet fragmentation protocol. For example, packet fragmentation may be performed in accordance with the IETF Proposed Standard entitled "The Multi-Class Extension To Multi-Link PPP," RFC 2686, published September 1999, available from "www.ietf.org." ("MCML Specification"), the "Frame Relay Fragmentation Implementation Agreement" as defined by FRF Standard 12, adopted in December 1997, available from "www.frforum.com" ("FRF.12 Specification"), and the IP Specification. Although the embodiments of the invention may use a packet fragmentation protocol as defined in the IP Specification, MCML Specification or the FRF.12 Specification, it can be appreciated that any packet fragmentation protocol may be used and still fall within the scope of the invention.

Figure 3:
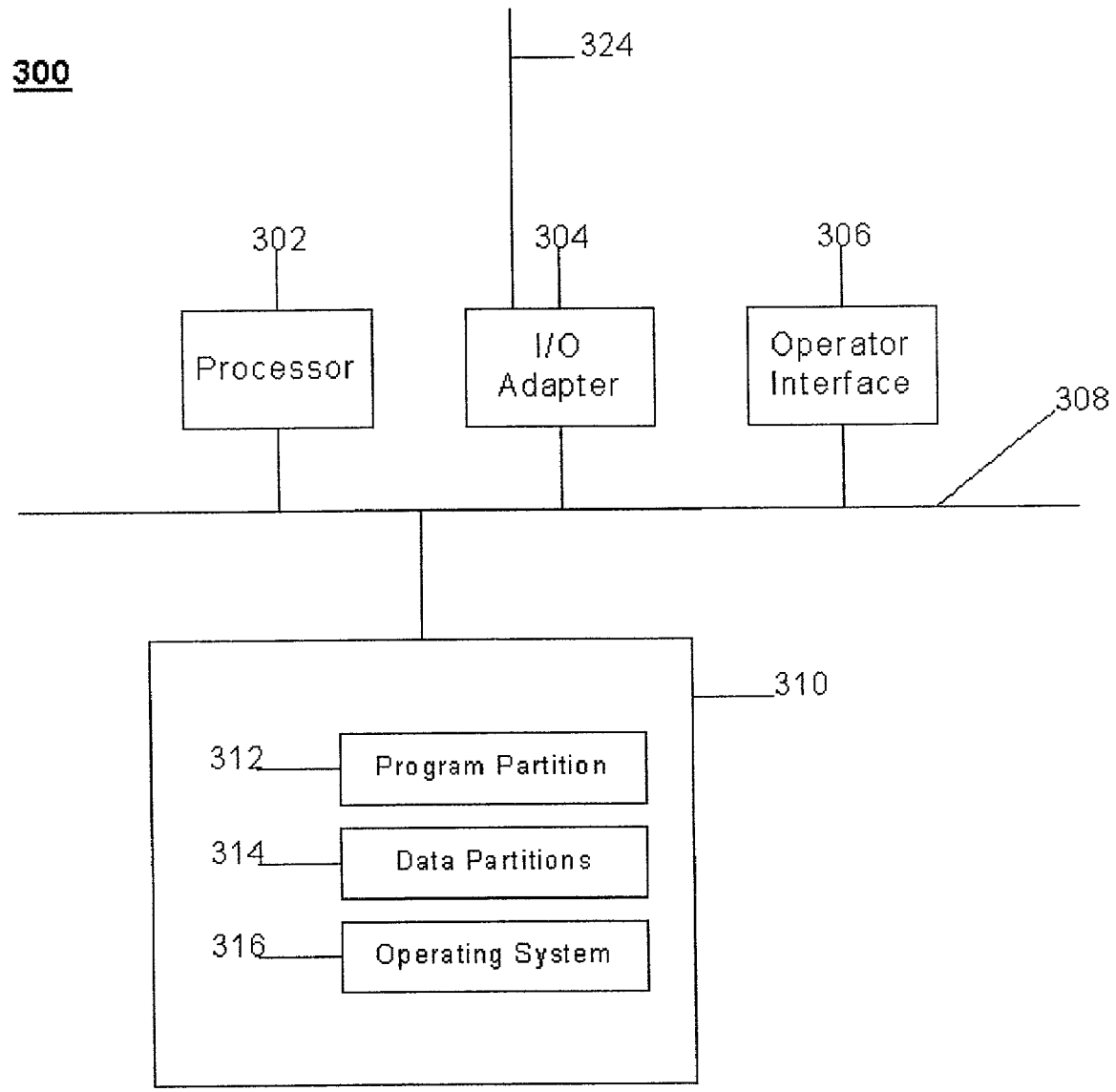
FIG. 3 is a block diagram of a node in accordance with one embodiment of the invention.

FIG. 3 is a block diagram of a node in accordance with one embodiment of the invention. FIG. 3 illustrates a node 300 that may be representative of a NAT device such as router 110. A NAT device may perform NAT in accordance with, for example, the information specification titled "Traditional IP Network Address Translator," as defined by RFC 3022, published January 2001 ("NAT Specification"), as modified by the principles set forth herein.

Node 300 may comprise a computer platform. In this embodiment of the invention, node 300 comprises a processor 302, an input/output (I/O) adapter 304, an operator interface 306, a memory 310, a monitoring module 318 and a scheduling module 320. Memory 310 may store computer program instructions and data. Processor 302 may execute the program instructions, and process the data, stored in memory 310. I/O adapter 304 may communicate with other devices and transfer data in and out of intermediate node 300 over connection 324. Operator interface 306 may provide an interface between a user and OS 316. Operator interface 306 may communicate commands between the user and OS 316, and provides status information to the user. All these elements are interconnected by bus 308, which allows data to be intercommunicated between the elements. I/O adapter 304 may represent one or more I/O adapters or network interfaces that can connect to local or wide area networks such as, for example, network 200. Therefore, connection 324 may represent a connection to a network or a direct connection to other equipment. It can be appreciated that node 300 may have any number of I/O adapters and connections, such as I/O adapter 304 and connection 324, and still fall within the scope of the invention.

Processor 302 can be any type of processor capable of providing the speed and functionality desired to implement embodiments of the invention. For example, processor 302 may be a processor from a family of processors made by Intel Corporation, Motorola, Compaq, AMD Corporation and Sun Microsystems.

Memory 310 may comprise any media capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM) and any other device or signal that can store digital information. In one embodiment, the instructions may be stored on the medium in a compressed and/or encrypted format. As used herein, the phrase "adapted to be executed by a processor" is meant to encompass instructions stored in a compressed and/or encrypted format, as well as instructions that may be compiled or installed by an installer before being executed by the processor. Further, node 300 may contain various combinations of machine-readable storage devices through other I/O controllers, which are accessible by processor 302 and which are capable of storing a combination of computer program instructions and data.

In one embodiment of the invention, memory 310 comprises an operating system 316, a program partition 312 and a data partition 314. Program partition 312 may store and allow execution by processor 302 of program instructions that implement the functions of each respective node described herein, such as source node 102, intermediate nodes 202 and 206, and router 110. Data partition 314 may store data to be used during the execution of program instructions.

I/O adapter 304 may be a network interface that may comprise any suitable technology for controlling communication signals between network devices using a desired set of communications protocols, services and operating procedures. In one embodiment of the invention, I/O adapter 304 operates in accordance with the TCP/IP Specification. In another embodiment of the invention, I/O adapter 304 operates in accordance with the Point-To-Point Protocol (PPP) as defined by the IETF Standard 51, RFC 1661, adopted in July 1994, and available from "www.ietf.org." In yet another embodiment of the invention, I/O adapter 304 may operate in accordance with various frame relay standards, such as the "Voice Over Frame Relay Implementation Agreement" as defined by the Frame Relay Forum (FRF) Standard 11, adopted in May 1997, Annex J Added March 1999, available from "www.fiforum.com" ("FRF.11 Specification"). In another embodiment of the invention, I/O adapter 304 may operate in accordance with various VOIP standards, such as the "Packet Based Multimedia Communications Systems" as defined by the International Telecommunications Union Telecommunications (ITU-T) Recommendation H.323, adopted in February 1998, available from "www.itu.int" ("H.323 Specification"). In yet another embodiment of the invention, I/O adapter 304 may operate in accordance with "Real Time Protocol (RTP): A Transport Protocol For Real Time Applications" as defined by the IETF Proposed Standard, RFC 1889, published in January 1996, and available from "www.ietf.org" ("RTP Specification"). In another embodiment of the invention, I/O adapter 304 may operate in accordance with "SIP: Session Initiation Protocol" as defined by the IETF Proposed Standard, RFC 2543, published in March 1999, and available from "www.ietf.org" ("SIP Specification). These are just examples and many other protocols may be employed in alternating embodiments.

I/O adapter 304 also includes connectors for connecting I/O adapter 304 with a suitable communications medium. Those skilled in the art will understand that I/O adapter 304 may receive information signals over any suitable communication medium such as twisted-pair wire, co-axial cable, fiber optics, radio frequencies, and so forth.

Figure 4:
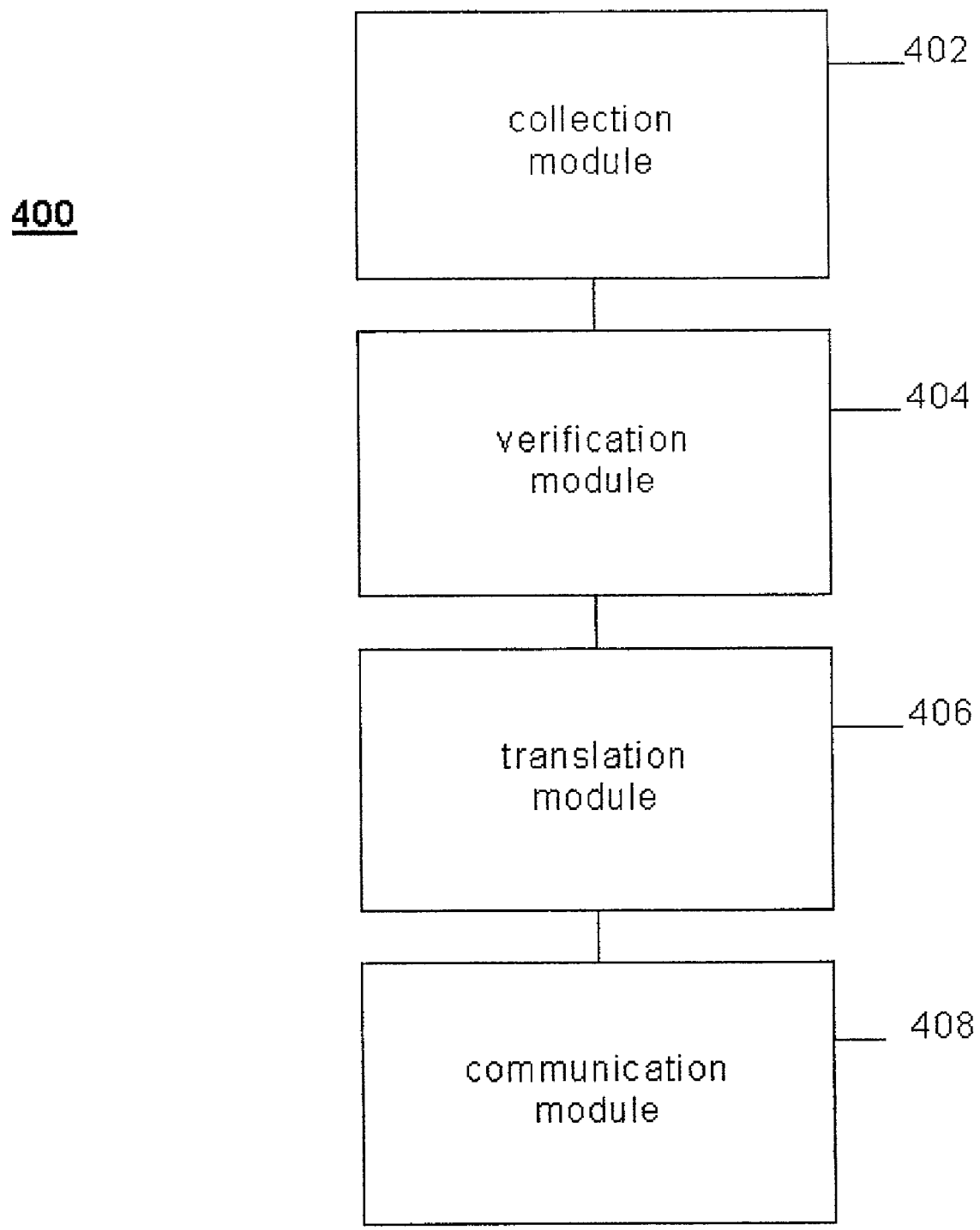
FIG. 4 is a block diagram of a packet fragmentation manager (PFM) in accordance with one embodiment of the invention.

FIG. 4 is a block diagram of a program partition in accordance with one embodiment of the invention. FIG. 4 illustrates a program partition that may be representative of program partition 312, with the program partition having a packet fragmentation manager (PFM) 400. In this embodiment, PFM 400 may contain program instructions to manage packet fragmentation for a NAT device, such as router 110. More particularly, PFM 400 may utilize four sets of program instructions referred to herein as a collection module 402, verification module 404, translation module 406 and communication module 408, respectively. Of course, the scope of the invention is not limited to these particular sets of instructions.

The operations of systems 100, 200 and 300, and modules 400, 402, 404, 406 and 408, may be further described with reference to FIGS. 5-7 and accompanying examples. Although FIGS. 5-7 as presented herein may include a particular processing logic, it can be appreciated that the processing logic merely provides an example of how the general functionality described herein can be implemented. Further, each operation within a given processing logic does not necessarily have to be executed in the order presented unless otherwise indicated.

Figure 5:
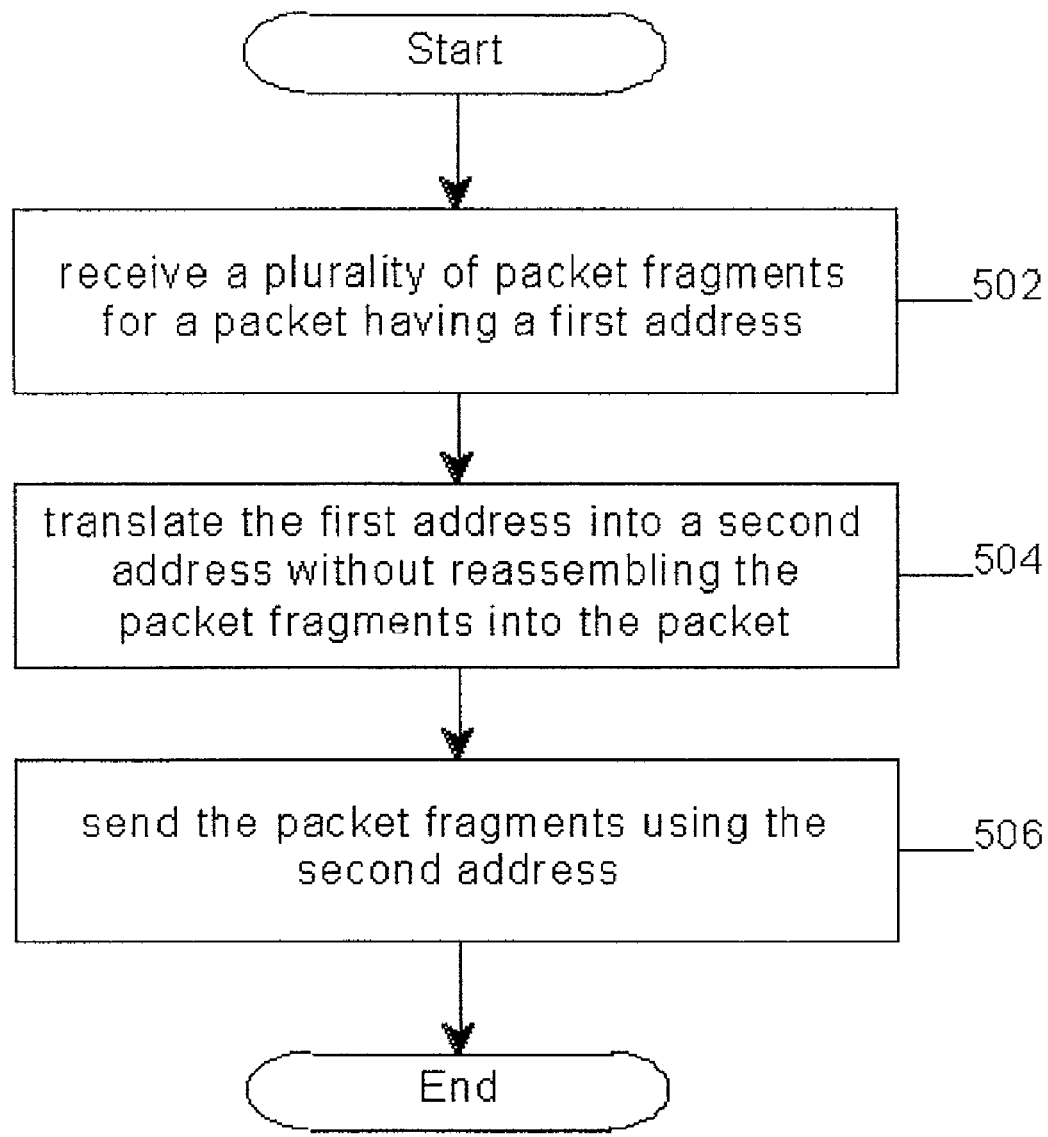
FIG. 5 is a first block flow diagram of the processing logic performed by a PFM in accordance with one embodiment of the invention.

FIG. 5 is a first block flow diagram of the processing logic performed by a packet fragmentation manager (PFM) in accordance with one embodiment of the invention. Processing logic 500 may illustrate a method to manage packet fragmentation for address translation. A plurality of packet fragments for a packet having a first address may be received at block 502. The first address may be translated into a second address without reassembling the packet fragments into the packet at block 504. The packet fragments may be sent using the second address at block 506.

Figure 6:
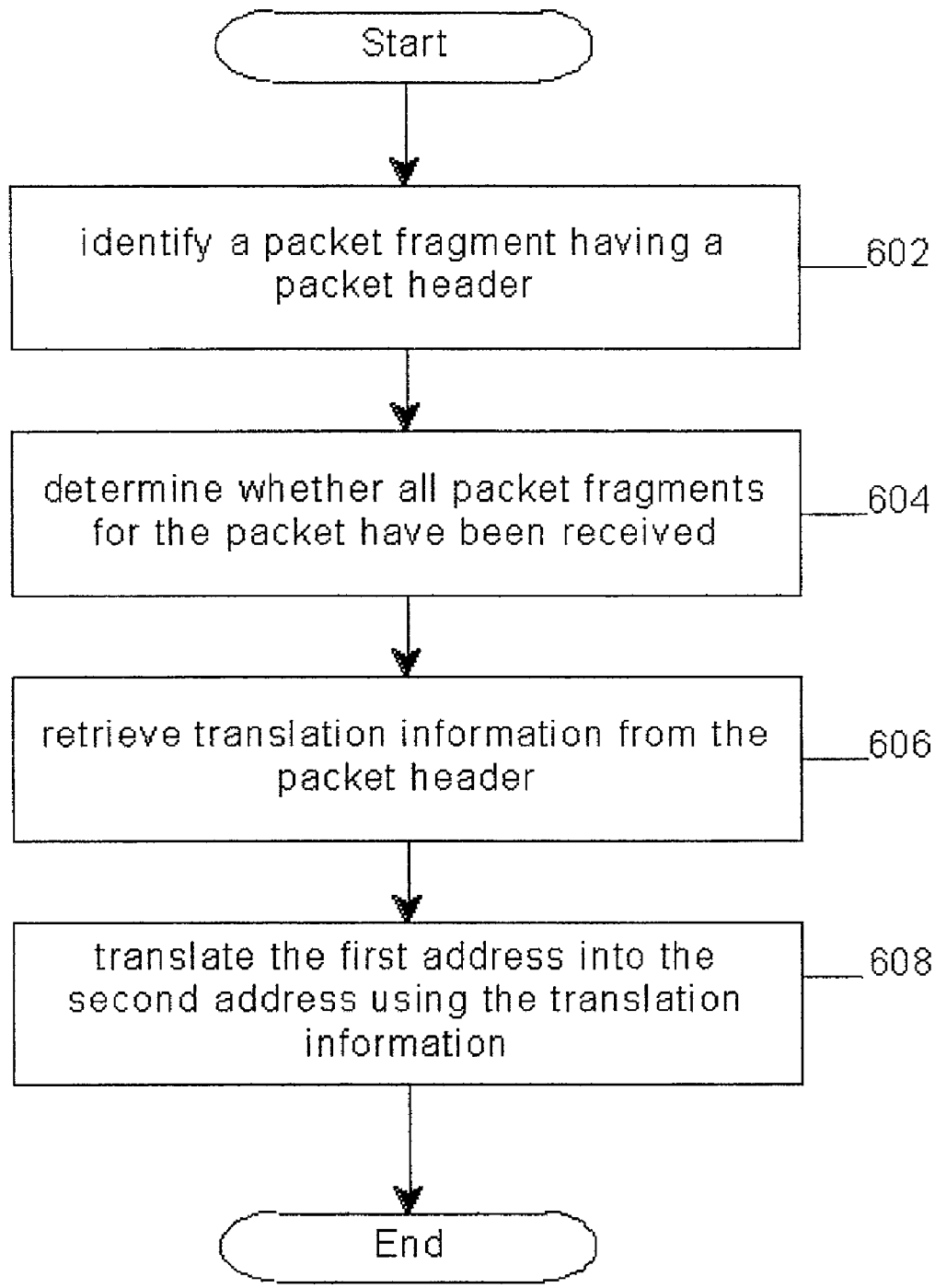
FIG. 6 is a second block flow diagram of the processing logic for a PFM in accordance with one embodiment of the invention.

FIG. 6 is a second block flow diagram of the processing logic performed by a packet fragmentation manager (PFM) in accordance with one embodiment of the invention. Processing logic 600 may illustrate a method to manage packet fragmentation for address translation, and more particularly, a method to translate the first address into a second address. A packet fragment having a packet header may be identified at block 602. The packet header may have, for example, a packet identifier, translation information and a packet length. A determination is made as to whether all packet fragments for the packet have been received at block 604. Translation information may be retrieved from the packet header at block 606. The first address may be translated into the second address using the translation information at block 608.

The translation information may be any information that is desired to translate one address to another address. For example, many NAT devices may utilize a port number to perform address translation.

In one embodiment of the invention, each packet fragment may include a packet fragment header. The packet fragment header may include, for example, a packet identifier, a more bit and an offset value. A determination may be made as to whether all packet fragments for the packet have been received using the "more bit" of the packet fragment header. More particularly, the packet fragment header for each packet fragment may be evaluated to determine the status of the "more bit." The "more bit" as referred to herein may refer to a flags field that is included as part of a packet fragment header. The more bit may indicate whether more packet fragments are to follow. If the more bit for a packet fragment is set to the predetermined position (e.g., "1" or "0") that indicates that more packet fragments are to follow, then the packet fragment may be stored with other packet fragments having the same packet identifier. Typically, the more bit is set for all packet fragments except for the last packet fragment. The term "packet identifier" as used herein may refer to an identifier for a packet from which the packet fragment was generated. A determination may be made as to whether all packet fragments for the packet have been received using the offset value for each stored packet fragment. The term "offset value" as referred to herein may include a value that indicates the position in which the data from the packet fragment fits into the original (i.e., unfragmented) packet. For example, in one embodiment of the invention the offset value may specify the original packet position in bytes divided by eight.

In one embodiment of the invention, a determination may be made as to whether all packet fragments for the packet have been received using only the offset values of the packet fragment header. The first packet fragment from a packet typically has an offset value of zero (0) since it represents the first position in the original packet. Therefore, each packet fragment may be evaluated to determine the offset value for the packet fragment. Those packet fragments having the same packet identifier and having an offset value other than zero (0) may be stored by the NAT device. A determination may be made as to whether all packet fragments for the packet have been received using the offset values of the stored packet fragments.

Figure 7:
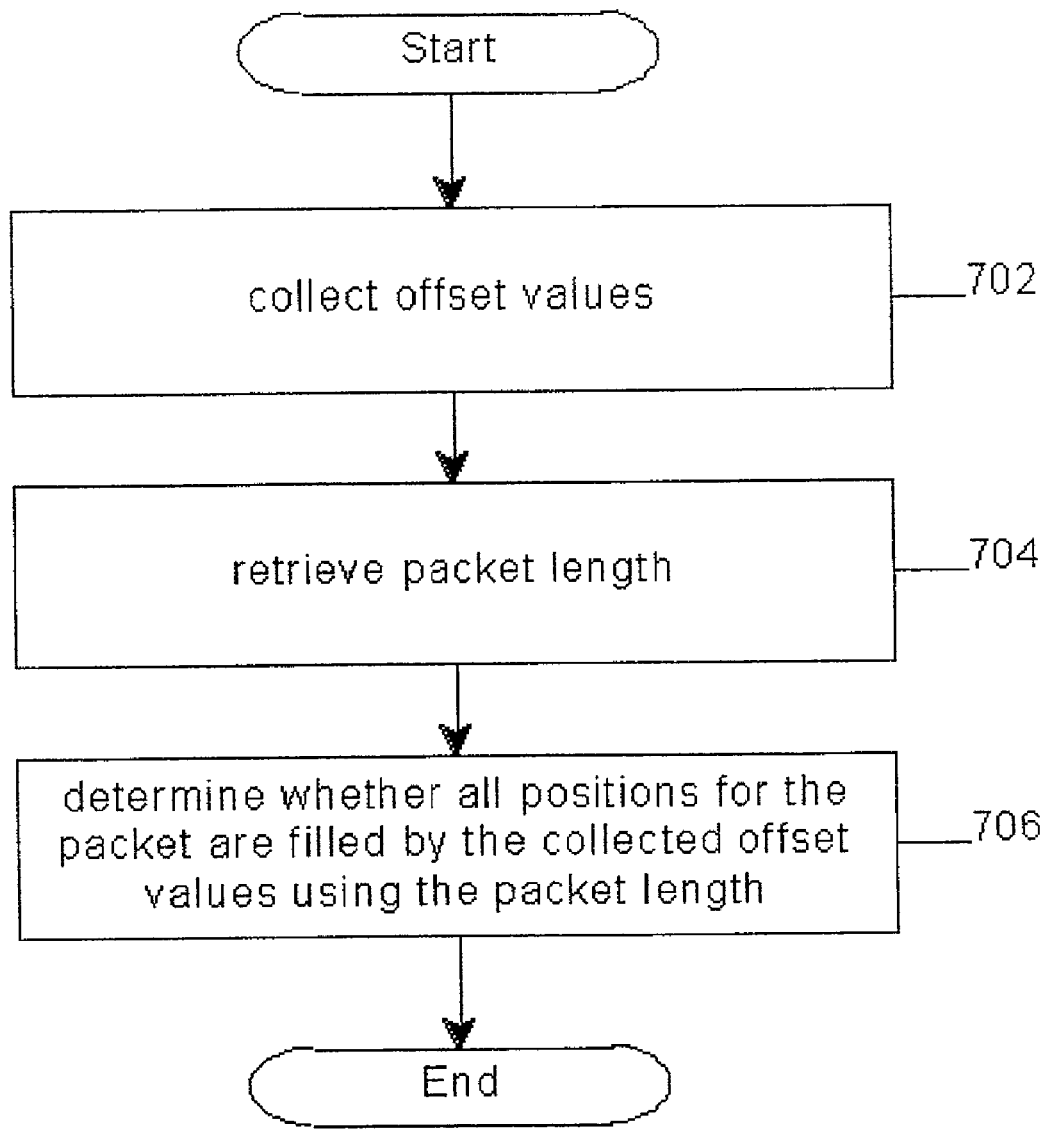
FIG. 7 is a third block flow diagram of the processing logic for a PFM in accordance with one embodiment of the invention.

FIG. 7 is a third block flow diagram of the processing logic performed by a packet fragmentation manager (PFM) in accordance with one embodiment of the invention. Processing logic 700 may illustrate a method to determine whether all packet fragments for the packet have been received using the offset values of the stored packet fragments. Offset values for the stored packet fragments may be collected at block 702. A packet length for the packet from which the packet fragments originated may be retrieved at block 704. A determination as to whether all positions for said packet are filled by the collected offset values may be made using the packet length.

More particularly, the offset values may be evaluated to determine whether there are any gaps or missing positions between the starting position and the ending position. The starting position may be indicated by an offset value of zero (0), while the ending position may be indicated by the packet length. For example, if the packet length was 1500 bytes, then the final packet fragment should have the appropriate value indicating the last byte (i.e., eight bits) position of the original 1500 bytes. The collected offset values may be evaluated to determine whether all the positions for the original packet are represented by the offset values of the stored packet fragments.

Terminating conditions may be set to prevent the additional storage or collection of packet fragments due to resource limitations. For example, an upper limit may be set as to the number of packet fragments that may be collected according to memory or processing limitations. There may also be a timer to release or "free" fragments that have existed for a certain period of time without collection of all its peers. In one embodiment of the invention, the occurrence of a terminating condition may be detected prior to receiving all of the packet fragments for a packet. Certain actions may be configured to occur in accordance with certain terminating conditions, such as releasing the packet fragments if all packet fragments are not collected within a predefined time period.

The operations of systems 100, 200 and 300, and modules 400, 402, 404, 406 and 408, may be further described using the following example. Assume source node 102 is sending a packet to a destination node that is part of LAN 112, such as node 114, via intermediate node 202. Intermediate node 202 receives the packet and implements packet fragmentation to reduce latency times through network 106.

Packet fragmentation is performed in accordance with the IP Specification. The packet is broken up into packet fragments, with the first packet fragment having packet header with a port number representing the destination address for the packet. The remaining packet fragments include a packet fragment header that includes a packet identifier of 22, a more bit with 1 indicating more bits to follow, and offset values representing the position of the data carried by the packet fragment in the original packet.

The packet fragments are sent to LAN 112 via router 110. Router 110 performs NAT in accordance with the NAT Specification. Router 110 includes a packet fragmentation manager (PFM) such as PFM 400. Collection module 402 of PFM 400 receives the packet fragments from intermediate node 202. Collection module 402 may perform some administrative functions on the packet fragment, such as retrieving the packet length from the first packet fragment of a series of packet fragments, and retrieving the packet identifier, more bit and offset value for each packet fragment. Collection module 402 may also manage a plurality of queues, with each queue representing the packet fragments for a particular packet as identified by the packet identifier. The queue may be managed by, for example, partitioning memory in a predetermined manner, with each section representing packet fragments for a packet. The queue may also be manager by, for example, maintaining a linked list of packet fragments in system memory or shared memory. Any conventional technique for maintaining logical or physical queues of packet fragments for a packet may be used and still fall within the scope of the invention. A portion of this information may be passed to verification module 404.

Verification module 404 may use the offset values and the packet length received from collection module 402 to verify whether all the packet fragments for a particular packet have been received. Each offset value may represent a position from the starting position to the ending position of the original packet. The ending position may be represented by, for example, the packet length. Verification module 404 may, for example, maintain a verification table indexed by position segments, and fill in the table as the packet fragments are collected by collection module 402. For example, the position segments may be represented in bytes divided by eight (8). Once all the table entries are filled, verification module 404 may send a message to translation module 406 to begin the NAT process. A timer may be used to determine whether empty table entries exist prior to timer expiration. If such a condition occurs, verification module 404 may send a message to communication module 408 to release all queued packet fragments for use by system or network. For example, the queued packet fragments may be processed using the normal assembly/disassembly packet fragmentation process as defined by the IP Specification.

Translation module 406 may receive the verification message from verification module 404 and begin the NAT process. The NAT process may be implemented as part of translation module 406, or may be invoked by translation module 406 from another part of router 110. Translation module 406 may use translation information from the packet header to translate the original external destination address into a new internal destination address for use with LAN 112, for example. The translation information may comprise, for example, a port number that is part of the packet header sent with the first packet fragment in a series of packet fragments. The new internal destination address may be the destination address for node 114 of LAN 112. Translation module 406 may pass the new internal destination address to communication module 408, as well as a message to collection module 402 to send the start address for the queue of packet fragments to communication module 408.

Communication module 408 may use the new internal destination address and the queue start address to begin sending the packet fragments to node 114. Conventional NAT devices would first assemble the packet fragments into the original packet, perform NAT, and then disassemble the original packet with the new address into packet fragments for communication to node 114. By way of contrast, communication module 408 may simply modify each packet fragment header with the new destination address and begin sending the queued packet fragments to node 114.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to manage packet fragmentation for address translation, comprising:
   receiving a plurality of packet fragments for a packet having a first address, wherein each packet fragment includes a packet fragment header having a packet offset value and a more bit, said offset value representing a position from a starting position to an ending position of said packet, said more bit set to a predetermined position indicating that more packet fragments are to follow;
   translating said first address into a second address without reassembling said packet fragments into said packet;
   determining whether all packet fragments for said packet have been received by determining a status of said more bit for each packet fragment, collecting offset values in a verification table, indexing collected offset values by position in said verification table, and evaluating said collected offset values to identify any mi ssing positions between said starting position and said ending position; and sending said packet fragments using said second address.

2. The method of claim 1, wherein said translating comprises:
 identifying said packet fragment having a packet header, with said packet header having a packet identifier, translation information and a packet length;
 retrieving translation information from said packet header; and
 translating said first address into said second address using said translation information.

3. The method of claim 2, wherein said translation information comprises a port number.

4. The method of claim 2, wherein each of said packet fragment includes said packet fragment header having said packet identifier, and said determining comprises:
 storing each packet fragment having said packet identifier and said more bits set to predetermined values.

5. The method of claim 1, wherein each offset value represents a position for said packet fragment in said packet, and said determining whether all packet fragments for said packet have been received using said offset values comprises:
 retrieving said packet length; and
 determining whether all positions for said packet are filled by said collected offset values using said packet length.

6. The method of claim 2, wherein each packet fragment includes a packet fragment header having said packet identifier and said determining comprises:
 storing each packet fragment having said packet identifier and said offset value is a value other than zero; and
 determining whether all packet fragments for said packet have been received using said offset values.

7. The method of claim 6, wherein each offset value represents a position for said packet fragment in said packet, and said determining whether all packet fragments for said packet have been received using said offset values comprises:
 retrieving said packet length; and
 determining whether all positions are filled by said collected offset values using said packet length.

8. The method of claim 5, wherein each offset value represents a position in bytes divided by eight for said packet fragment in said packet.

9. The method of claim 7, wherein each offset value represents a position in bytes divided by eight for said packet fragment in said packet.

10. The method of claim 1, further comprising: detecting an occurrence of a terminating condition prior to receiving all of said packet fragments for said packet; and releasing said packet fragments in accordance with said detection.

11. A packet fragmentation manager to manage packet fragmentation for address translation, comprising:
 a collection module to collect and store a plurality of packet fragments for a packet having a first address, wherein each packet fragment includes a packet fragment header having a packet offset value and a more bit, said offset value representing a position from a starting position to an ending position of said packet, said more bit set to a predetermined position indicating that more packet fragments are to follow;
 a verification module to verify all packet fragments for said packet have been received; and
 a translation module to retrieve translation information from one of said packet fragments and to translate said first address into a second address using said translation information, without reassembling said packet fragments into said packet,
 wherein said verification module is to determine whether all packet fragments for said packet have been received by determining a status of said more bit for each packet fragment, collecting offset values in a verification table, indexing collected offset values by position in said verification table, and evaluating said collected offset values to identify any missing positions between said staffing position and said ending position.

12. The packet fragmentation manager of claim 11, further comprising a communication module to send said packet fragments to said second address.

13. A system to manage packet fragmentation for an address translation device, comprising:
 a source node to send packet fragments for a packet having a first address, wherein each packet fragment includes a packet fragment header having a packet offset value and a more bit, said more bit set to a predetermined position indicating that more packet fragments are to follow; and
 an intermediate node to receive said packet fragments and to translate said first address to a second address without reassembling said packet fragments into said packet;
 wherein said intermediate node is further adapted to index offset values from each packet fragment in a verification table to determine whether all packet fragments for said packet have been received, each of said offset values representing a position from a starting position to an ending position of said packet, said intermediate node to determine a status of said more bit for each packet fragment, collect offset values in said verification table, index collected offset values by position in said verification table, and evaluate said collected offset values to identify any missing positions between said starting position and said ending position.

14. The system of claim 13, further comprising a destination node having said second address to receive said packet fragments and reassemble said packet fragments into said packet.

15. A system to manage packet fragmentation for an address translation device, comprising:
 a computer platform adapted to manage packet fragmentation;
 said platform being further adapted to receive a plurality of packet fragments for a packet having a first address, translate the first address into a second address without reassembling said packet fragments into said packet, and send said packet fragments using said second address, wherein each packet fragment includes a packet fragment header having a packet offset value and a more bit, said more bit set to a predetermined position indicating that more packet fragments are to follow;
 wherein said platform is further adapted to index offset values from each packet fragment in a verification table to determine whether all packet fragments for said packet have been received, each of said offset values representing a position from a starting position to an ending position of said packet, said intermediate node to determine a status of said more bit for each packet fragment, collect offset values in said verification table, index collected offset values by position in said verification table, and evaluate said and said ending position.

16. The system of claim 15, wherein said platform is further adapted to perform said translation by identifying a packet fragment having a packet header, with said packet header having a packet identifier, translation information and a packet length, determining whether all packet fragments for said packet have been received, retrieving translation information from said packet header, and translating said first address into said second address using said translation information.

17. The system of claim 15, wherein said platform is further adapted to retrieve a packet length for said packet, and determine whether all positions for said packet are filled by said collected offset values using said packet length.

18. An article comprising:
a computer readable medium;
said computer readable medium including stored computer program instructions that executed by a computer result in receiving a plurality of packet fragments for a packet having a first address, translating said first address into a second address without reassembling said packet fragments into said packet, and sending said packet fragments using said second address, wherein each packet fragment includes a packet fragment header having a packet offset value and a more bit, said more bit set to a predetermined position indicating that more packet fragments are to follow;
wherein the stored computer program instructions executed by a computer further result in indexing offset values from each packet fragment in a verification table to determine whether all packet fragments for said packet have been received, each of said offset values representing a position from a starting position to an ending position of said packet, said intermediate node to determine a status of said more bit for each packet fragment, collect offset values in said verification table, index collected offset values by position in said verification table, and evaluate said collected offset values to identify any missing positions between said starting position and said ending position.

19. The article of claim 18, wherein the stored computer program instructions executed by a computer further result in said translating by identifying a packet fragment having a packet header, with said packet header having a packet identifier, translation information and a packet length, determining whether all packet fragments for said packet have been received, retrieving translation information from said packet header, and translating said first address into said second address using said translation information.

20. The article of claim 19, wherein the stored computer program instructions executed by a computer further result in retrieving a packet length for said packet, and determining whether all positions for said packet are filled by said collected offset values using said packet length.

21. The article of claim 18, wherein the stored computer program instructions executed by a computer further result in detecting an occurrence of a terminating condition prior to receiving all of said packet fragments for said packet, and releasing said packet fragments in accordance with said detection.

* * * * *

UNITED STATES PATENT AND TRADEMARK OFFICE
CERTIFICATE OF CORRECTION

| | |
|---|---|
| PATENT NO. | : 7,298,745 B2 |
| APPLICATION NO. | : 10/015959 |
| DATED | : November 20, 2007 |
| INVENTOR(S) | : Egevang |

It is certified that error appears in the above-identified patent and that said Letters Patent is hereby corrected as shown below:

In column 10, line 67, in Claim 1, delete "mi" and insert -- mi- --, therefor.

In column 11, line 2, in Claim 1, after "position;" insert -- sending a verification message once all entries in said verification table are filled; translating said first address into a second address, without reassembling said packet fragments into said packet, in response to said verification message; --.

In column 12, line 11, in Claim 11, delete "staffing" and insert -- starting --, therefor.

In column 12, line 11, in Claim 11, after "position" delete "." and insert -- ; wherein said verifications module is to send a verification message to said translation module once all entries in said verification table are filled, and said translation module is to translate said first address into said second address, without reassembling said packet fragments into said packet, in response to said verification message. --, therefor.

In column 12, line 38, in Claim 13, after "position" delete "." and insert -- ; wherein said intermediate node is further adapted to send a verification message once all entries in said verification table are filled and to translate said first address into said second address, without reassembling said packet fragments into said packet, in response to said verification message. --, therefor.

In column 12, line 66, in Claim 15, after "evaluate said" insert -- collected offset values to identify any missing positions between said starting position --.

In column 12, lines 66-67, in Claim 15, after "position" delete "." and insert --; wherein said platform is further adapted to send a verification message once all entries in said verification table are filled and to translate said first address into said second address, without reassembling said packet fragments into said packet, in response to said verification message. --, therefor.

In column 13, line 17, in Claim 18, after "that" insert -- , when --.

In column 13, line 17, in Claim 18, after "computer" insert -- , --.

In column 13, line 28, in Claim 18, after "computer" insert -- , --.

UNITED STATES PATENT AND TRADEMARK OFFICE
CERTIFICATE OF CORRECTION

PATENT NO.        : 7,298,745 B2
APPLICATION NO.   : 10/015959
DATED             : November 20, 2007
INVENTOR(S)       : Egevang It is certified that error appears in the above-identified patent and that said Letters Patent is hereby corrected as shown below:

In column 14, line 8, in Claim 18, after "position" delete "." and insert -- ; wherein the stored instructions, when executed by a computer, further result in sending a verification message once all entries in said verification table are filled and translating said first address into said second address, without reassembling said packet fragments into said packet, in response to said verification message. --, therefor.

In column 14, line 10, in Claim 19, after "instructions" insert -- , when --.

In column 14, line 10, in Claim 19, after "computer" insert -- , --.

In column 14, line 19, in Claim 20, after "instructions" insert -- , when --.

In column 14, line 19, in Claim 20, after "computer" insert -- , --.

In column 14, line 25, in Claim 21, after "instructions" insert -- , when --.

In column 14, line 25, in Claim 21, after "computer" insert -- , --

Signed and Sealed this

Twenty Second Day of April, 2008

JON W. DUDAS
*Director of the United States Patent and Trademark Office*